US009420537B2

(12) United States Patent
Gupta et al.

(10) Patent No.: US 9,420,537 B2
(45) Date of Patent: Aug. 16, 2016

(54) QUEUEING MECHANISM FOR CLIENT-SIDE NETWORK TRAFFIC TO REDUCE RADIO POWER CONSUMPTION ON MOBILE CLIENTS

(71) Applicant: Intel Corporation, Santa Clara, CA (US)

(72) Inventors: Maruti Gupta, Portland, OR (US); Erkut Demirhan, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/226,690

(22) Filed: Mar. 26, 2014

(65) Prior Publication Data

US 2015/0282086 A1 Oct. 1, 2015

(51) Int. Cl.
*H04W 52/02* (2009.01)
*H04W 28/14* (2009.01)

(52) U.S. Cl.
CPC ............ *H04W 52/0229* (2013.01); *Y02B 60/50* (2013.01)

(58) Field of Classification Search
CPC . H04W 52/0229; H04W 52/02; H04W 28/14; H04W 52/0216; H04W 28/0205; H04W 28/0215; H04W 72/04; H04L 47/50; H04L 12/863; H04L 47/32; Y02B 60/50
See application file for complete search history.

(56) References Cited

U.S. PATENT DOCUMENTS

| | | | | |
|---|---|---|---|---|
| 2004/0264396 | A1* | 12/2004 | Ginzburg | H04W 52/0232 370/311 |
| 2007/0245163 | A1* | 10/2007 | Lu | G06F 1/3203 713/300 |
| 2008/0039154 | A1* | 2/2008 | Oh | H04W 52/0235 455/574 |
| 2009/0203325 | A1* | 8/2009 | Wang | H04W 36/0088 455/69 |
| 2010/0002615 | A1 | 1/2010 | Gupta | |
| 2010/0056126 | A1* | 3/2010 | Tachikawa | H04W 76/048 455/418 |
| 2011/0158144 | A1* | 6/2011 | Sung | H04W 52/0216 370/311 |
| 2011/0317602 | A1 | 12/2011 | Gupta | |
| 2013/0070658 | A1 | 3/2013 | Noh et al. | |
| 2013/0080807 | A1 | 3/2013 | Theocharous et al. | |
| 2013/0223309 | A1 | 8/2013 | Hsiao et al. | |

OTHER PUBLICATIONS

Notification of Transmittal of the International Search Report and Written Opinion of the International Searching Authority, for International Application No. PCT/US2015/016791, mailed on Jun. 3, 2015, 15 pages.

Qualcomm Incorporated, "Managing Background Data Traffic in Mobile Devices," Jan. 2012, 16 pages.

* cited by examiner

*Primary Examiner* — Pablo Tran
(74) *Attorney, Agent, or Firm* — Schwabe, Williamson & Wyatt, P.C.

(57) ABSTRACT

Embodiments described herein relate generally to delaying the transmission of a plurality of data packets. A device may enter a packet-delay mode based on an absence of detected user activity and an idle state of a radio. In the packet-delay mode, the device may queue data packets in a buffer so that transmission of those data packets is delayed. The buffered data packets may be released and transmitted upon the occurrence of a predetermined event, such as detection of user activity, exceedance of a buffer threshold, or expiration of a countdown timer. Other embodiments may be described and claimed.

22 Claims, 8 Drawing Sheets

QUEUEING MECHANISM FOR CLIENT-SIDE NETWORK TRAFFIC TO REDUCE RADIO POWER CONSUMPTION ON MOBILE CLIENTS

FIELD OF INVENTION

Embodiments of the present invention relate generally to the technical field of data processing, and more particularly, to devices adapted to operate in wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by the inclusion in this section.

In mobile communications today, devices are generally adapted to execute a plurality of applications. These applications may be, for example, end-user software (e.g., social media applications, weather applications, etc.) and/or system software (e.g., operating system software, utility software, etc.). Frequently, an application may request data from an external source that is accessible over a network.

In a wireless communication system, a device may transmit a request using a radio of the device. Using the radio, the device may transmit the request to an access node, such as a base transceiver station and/or node B. The operations associated with transmitting a request over a network using a radio may cause appreciable power consumption at the device. In particular, a plurality of applications perpetually executed by a device, such as applications contemporaneously running in the background of the device, may be considerably expensive for a power source of the device (e.g., a battery).

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or "B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable hardware components that provide the described functionality.

Figure 1:
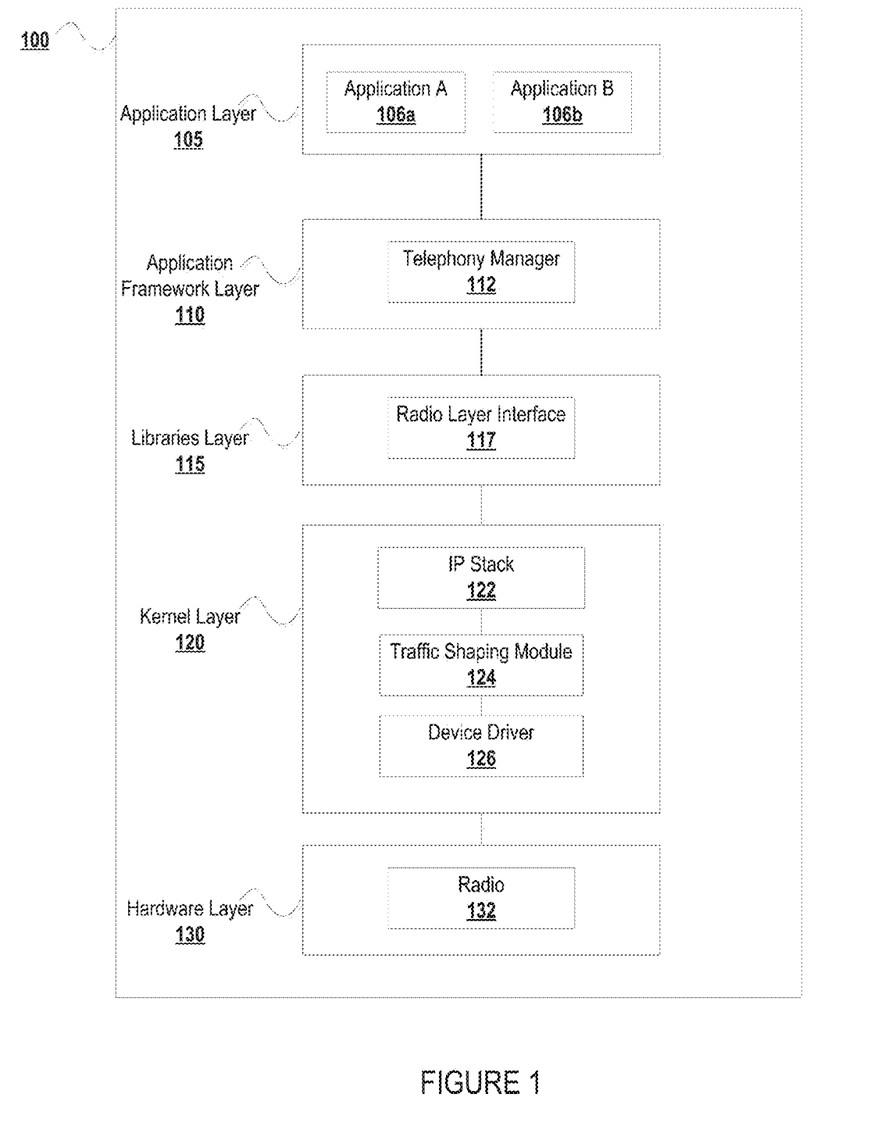
FIG. 1 is block diagram illustrating a device that is to include a protocol stack for network communication, in accordance with various embodiments.

Beginning first with FIG. 1, a block diagram shows a device 100 that is to include a protocol stack for network communication, in accordance with various embodiments. The device 100 may operate on a wireless cell provided by an access node (not shown) and/or be adapted for Wi-Fi communication. According to embodiments, the device 100 may be any device adapted to connect with an access node according to, for example, one or more 3GPP technical specifications. In some embodiments, the device 100 may be a user equipment ("UE"), such as a hand-held telephone, a smartphone, a tablet computer, a laptop computer, or other similar device equipped with a mobile broadband adapter. Therefore, the device 100 may be adapted to administrate one or more tasks in the environment 100, including mobility management, call control, session management, and identity management.

The device 100 may include a protocol stack comprised of a plurality of layers 105, 110, 115, 120, 130. FIG. 1 illustrates one possible stack for a device 100, and therefore other stack arrangements, such as the Open Systems Interconnection ("OSI") model, are contemplated herein. In the illustrated embodiment, the lowest layer is the hardware layer 130. This layer 130 features the physical interaction of hardware, such as a radio 132. The radio 132 may include circuitry adapted to wirelessly transmit and/or receive data using radio waves. According to various embodiments, the radio 132 may be adapted to communicate data according to, for example, a second Generation ("2G"), third Generation ("3G"), fourth Generation ("4G"), Wi-Fi, Worldwide Interoperability for Microwave Access ("WiMAX"), or other similar wireless protocol.

In various embodiments, each layer above the hardware layer 130 may include additional features and only the topmost layers 105, 110 may be visible to end users, such as consumers and/or developers. The application layer 105 may include a plurality of applications 106a-b. In various embodiments, a first application 106a may receive user input and/or interact with a second application 106b. An application 106 may be, for example, a network diagnostics application and/or data collection application. According to some embodiments, an application 106 may be adapted to generate a request for data that may require transmission over a network by the radio 132.

An application 106 at the application layer 105 may interface with one or more components included in the application framework layer 110. The application framework layer 110 may include basic and/or supporting functions for an application 106, such as resource management, activity management, content provision, and the like. Included in the application framework layer may 110 may be a telephony manager 112. The telephony manager 112 may provide access to subscriber services and/or telephony services at the device 100, such as management and/or configuration of one or more telephony networks to which the device 100 is adapted to connect.

Below the application framework layer 110, a protocol stack of the device 100 may include a libraries layer 115. The libraries layer 115 may enable the application framework layer 110 (and, by extension, the application layer 105) to handle different types of data and may be specific to the hardware layer 130 of the device 100. According to embodiments, a radio layer interface 117 is included in the libraries layer 115. The radio layer interface 117 may provide abstraction between components of layers, such as between telephony manager 112 and the radio 132. Accordingly, the radio interface layer 117 may introduce control flow without providing voice and packet services.

Residing between the hardware layer 130 and the other layers 105, 110, 115 is the kernel layer 120. The kernel layer 120 may manage input and/or output requests from the layers 105, 110, 115 and translate those requests into instructions for the radio 132, a processor (not shown), and/or other components of the hardware layer 130. According to various embodiments, the kernel layer 120 may include an internet protocol ("IP") stack 122, a traffic shaping module 124, and a device driver 126.

The IP stack 122 may specify how data, such as a request from an application 106, is to be formatted, addressed, transmitted, routed, and received over a network. In one embodiment, the IP stack 122 may implement a transmission control protocol ("TCP"). The IP stack 122 may packetize data by, for example, segmenting data into packets which are addressed and routed for communication over a network by the radio 132.

The transmission by the radio 132 of packets formed by the IP stack 122 may be expensive for a power source (not shown) of the device 100. Therefore, the traffic shaping module 124 may adjust traffic in a manner to reduce power consumption while still providing communication within desired latency objectives. In some embodiments, the traffic shaping module 124 may be adapted to retain one or more packets generated by the IP stack 122. In various embodiments, the traffic shaping module 124 may retain the one or more packets as a queue in one or more buffers included in the device 100. Accordingly, the traffic shaping module 124 may include or may be communicatively coupled with one or more buffers to retain data packets.

The traffic shaping module 124 may be adapted to determine information about the device 100. Based on the determined information about the device 100, the traffic shaping module 124 may retain or release data packets. In one embodiment, the traffic shaping module 124 is adapted to determine that the device 100 is in a low-power state. For example, the traffic shaping module 124 may determine that a radio state is idle and that the device is not in use by a user and therefore determine that the device 100 is in a low-power state. Based on this determination, the traffic shaping module 124 may retain one or more data packets generated by the IP stack 122, which may conserve power at the device 100.

Additionally, the traffic shaping module 124 may be adapted to determine that the device 100 is in a high-power state. According to embodiments, the traffic shaping module 124 may determine the device 100 is in the high-powered state based on, for example, a display of the device 100 (not shown) being in an on state, the reception of a downlink data packet by the radio 132, the expiration of a timer for which data packets are to be retained by the traffic shaping module 124, and/or the exceedance of a threshold amount of data packets that are to be retained by the traffic shaping module 124. Based on this determination, the traffic shaping module 124 may release one or more data packets generated by the IP stack 122 for transmission by the radio 132.

According to the embodiment, the traffic shaping module 124 may be implemented in the device 100 as hardware, software, or a combination of the two. For example, the traffic shaping module 124 may be implemented as a system on a chip ("SOC") or other similar integrated circuit. In one embodiment, the traffic shaping module 124 may be an application-specific integrated circuit ("ASIC") that includes, for example, some memory and/or storage (not shown). In a some embodiments, the traffic shaping module 124 may include a plurality of instructions that are to be executed by a processor (not shown) of the device 100.

The device driver 126 may control and/or operate one or more components of the hardware layer 130. For example, the device driver 126 may facilitate communication between the traffic shaping module 124 and the radio 132 so that one or more packets released by the traffic shaping module 124 may be transmitted by the radio 132.

Figure 2:
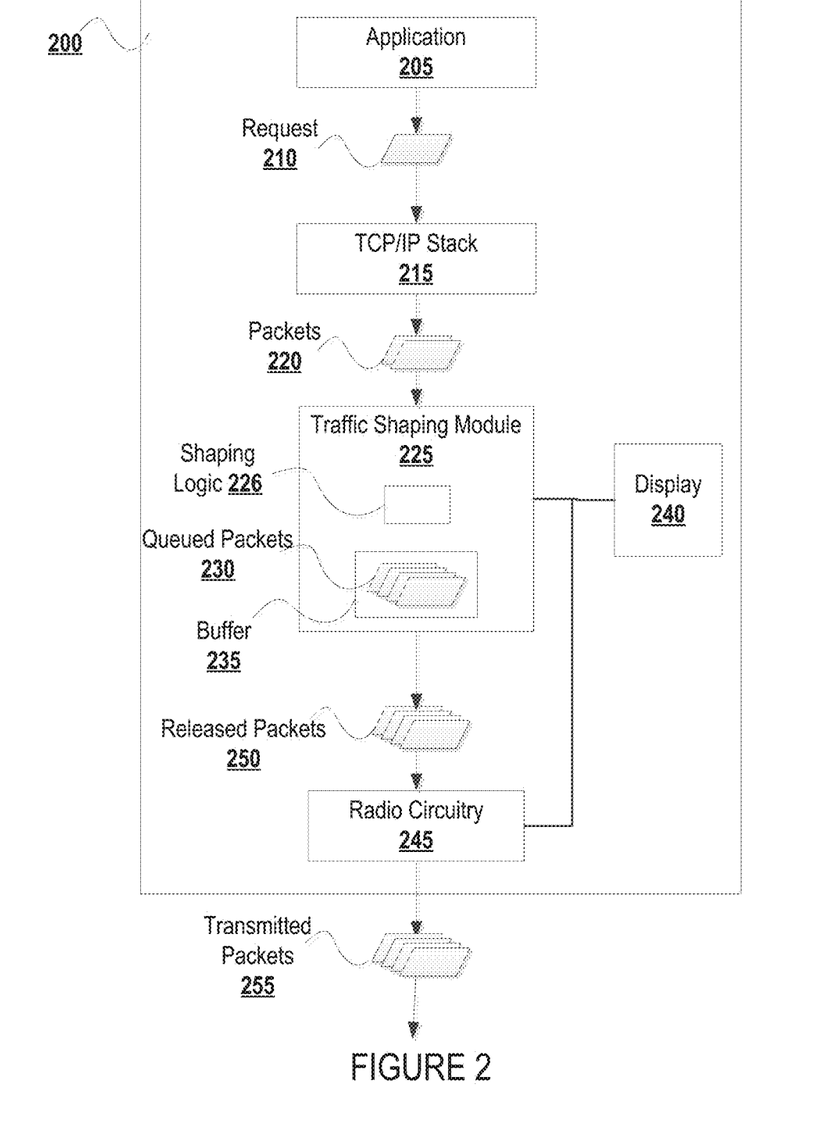
FIG. 2 is a block diagram illustrating a device that is to include a traffic shaping module to buffer a plurality of data packets prior to transmission over a network, in accordance with various embodiments.

Turning now to FIG. 2, a block diagram illustrates a device 200 that is to include a traffic shaping module 225 to buffer a plurality of data packets prior to transmission over a network, in accordance with various embodiments. The device 200 may be or may be included in the device 100 of FIG. 1. The device 200 includes at least one application 205 that is adapted to generate a request 210. The request 210 may be adapted to be serviced outside of the device 200.

Based on the request 210, a TCP/IP stack 215 of the device 200 may generate one or more packets 220 so that the request 210 may be transmitted as data packets 220 according to the TCP/IP protocol. The packets 220 are intercepted by a traffic shaping module 225 that includes or is communicatively coupled with a buffer 235. The traffic shaping module 225 may be adapted to retain the packets 220 in a buffer 235 prior to transmission by the radio circuitry 245.

The traffic shaping module 225 may include shaping logic 226 adapted to determine how to retain the packets 220. According to embodiments, the traffic shaping module 225 may be communicatively coupled with a display 240 and/or a radio circuitry 245 of the device 200. The traffic shaping module 225 may query the respective states of the display 240 and/or the radio circuitry 245. Where the state of the display 240 indicates inactivity (e.g., an off state) and/or the state of the radio circuitry 245 is idle, the shaping logic 226 may queue the packets 230 in one or more buffers 235. The traffic shaping module 225 may prevent the radio circuitry 245 from transmitting those queued packets 230 for a period of time, and therefore may conserve resources (e.g., power) of the device 200.

According to various embodiments, where at least one state of the display 240 and the radio circuitry 245 is determined by the traffic shaping module 225 to change to a high-power state, the traffic shaping module 225 may release the queued packets 230 in the buffer 235. For example, if traffic shaping module 225 determines that the display 240 is activated (e.g., turned on) and/or the radio circuitry 245 is connected, then the traffic shaping module 225 may release the packets 230 queued in the buffer 235.

In some embodiments, the traffic shaping module 225 may include ancillary logic adapted to further to determine how to retain the packets 220. According to an embodiment, the buffer may be associated with a threshold (e.g., a maximum capacity). When the packets 230 queued in the buffer 235 reach the threshold, the traffic shaping module 225 may be adapted to release the queued packets 230.

In another embodiment, the traffic shaping module 225 may include a countdown timer. The countdown timer may be coupled with the shaping logic 226. The shaping logic 226 may reference the countdown timer to prevent the packets 230 in the buffer 235 from becoming stale. In various embodiments, the countdown timer may begin when, for example, the traffic shaping module 225 determines that the state(s) exists for packets to be retained, when at least one packet is retained, or other similar condition. The queued packets 230 may be released from the buffer 235 when the countdown timer expires. According to some embodiments, the countdown timer may be configurable. Thus, the device 200 may receive input from a user and/or an access node that sets the duration of the countdown timer.

The packets released from the buffer 235 by the traffic shaping module 225, which may be referred to as released packets 250, may be received by the radio circuitry 245. The radio circuitry 245 may then cause transmitted packets 255 to be sent over a network.

Figure 3:
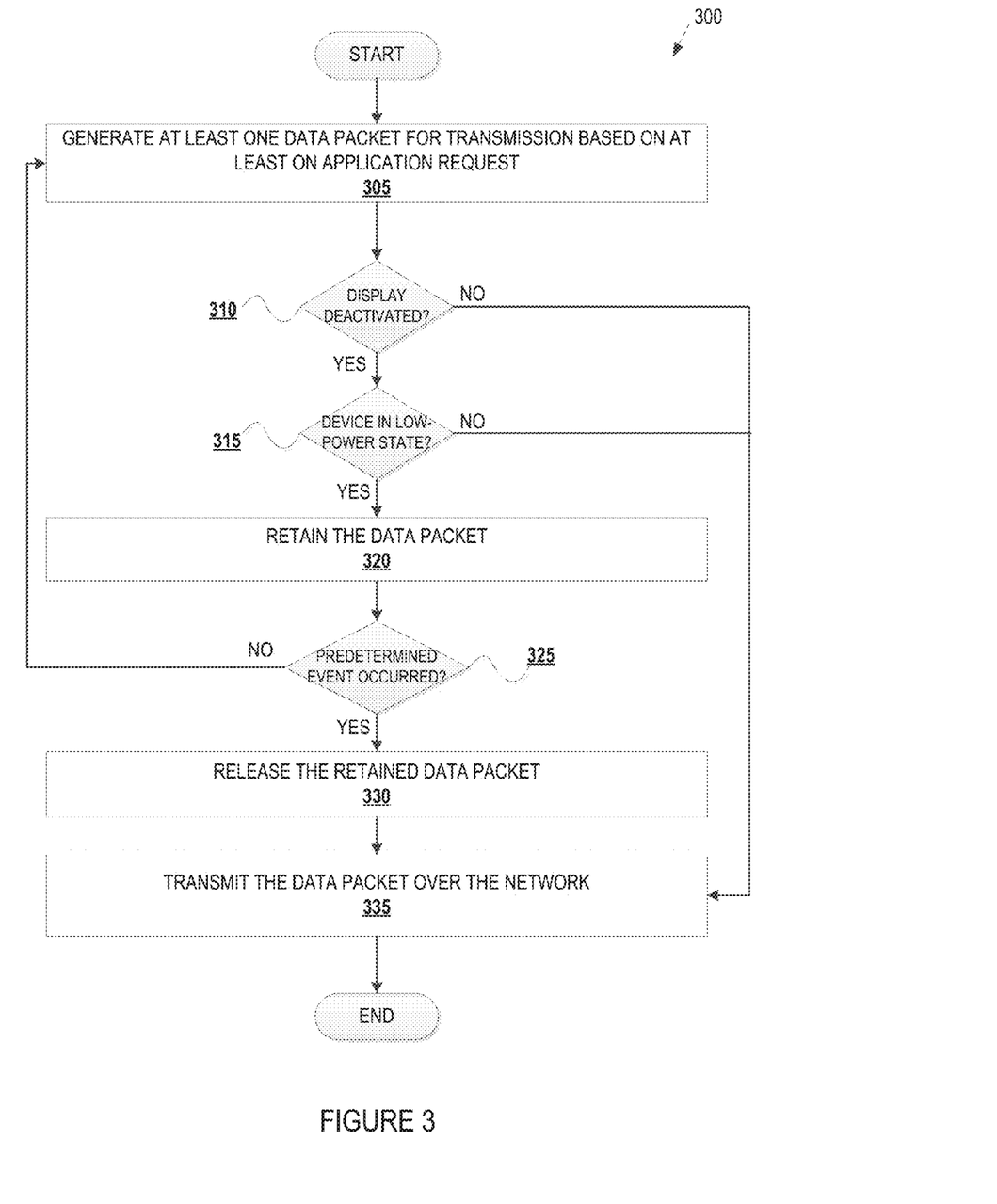
FIG. 3 is a flow diagram illustrating a method for retaining a plurality of data packets for transmission over a network upon the occurrence of a predetermined event, in accordance with various embodiments.

With respect to FIG. 3, a flow diagram is shown illustrating a method 300 for retaining a plurality of data packets for transmission over a network upon the occurrence of a predetermined event, in accordance with various embodiments. The method 300 may be performed by the device 100 illustrated in FIG. 1. While FIG. 3 illustrates a plurality of sequential operations, one of ordinary skill would understand that one or more operations of the method 300 may be transposed and/or performed contemporaneously.

Beginning at operation 305, the method 300 may include generating at least one data packet for transmission over a network based on at least one request. In embodiments, a request to be transmitted over a network may be packetized for transmission according to a TCP/IP or other transmission protocol.

Decision block 310 may include determining if a display is deactivated. Where the display is not deactivated, the method 300 may advance to operation 335 for transmitting the at least one data packet over the network. Conversely, where the display is determined to be deactivated, the method 300 may reach decision block 315.

Decision block 315 may include determining that the device is in a low-power state. This determination may be based on the state of the display as well as a state of one or more components that may be included in a device performing the method 300. For example, a radio in an idle state may further indicate that the device is in a low-power state. Where the device is not in a low-power state, the method 300 may advance to operation 335 for transmitting the at least one data packet over the network.

Based on an indication at decision block 315 that the device is in a low-power state, the method 300 may reach operation 320. Operation 320 may include retaining the data packet. In various embodiments, the data packet may be queued in one or more buffers of a device.

Subsequently, decision block 325 may include determining that a predetermined event has occurred. Where decision block 325 indicates that the predetermined event has not occurred, the method 300 may return to operation 305 to iterate through the enumerated operations. Consequently, a plurality of data packets may be retained without being transmitted, as illustrated at operation 320. These data packets may be queued in one or more buffers, as described herein.

Based on the determined occurrence of the predetermined event, the method 300 may reach operation 330. Operation 330 may include releasing the retained data packet and, where a plurality of data packets has been retained, releasing the plurality of retained data packets. Accordingly, operation 335 includes transmitting the released one or more data packets over the network. In view of the foregoing operations, one or more data packets may be retained while a device is in a low-power state to conserve power at the device.

Figure 4:
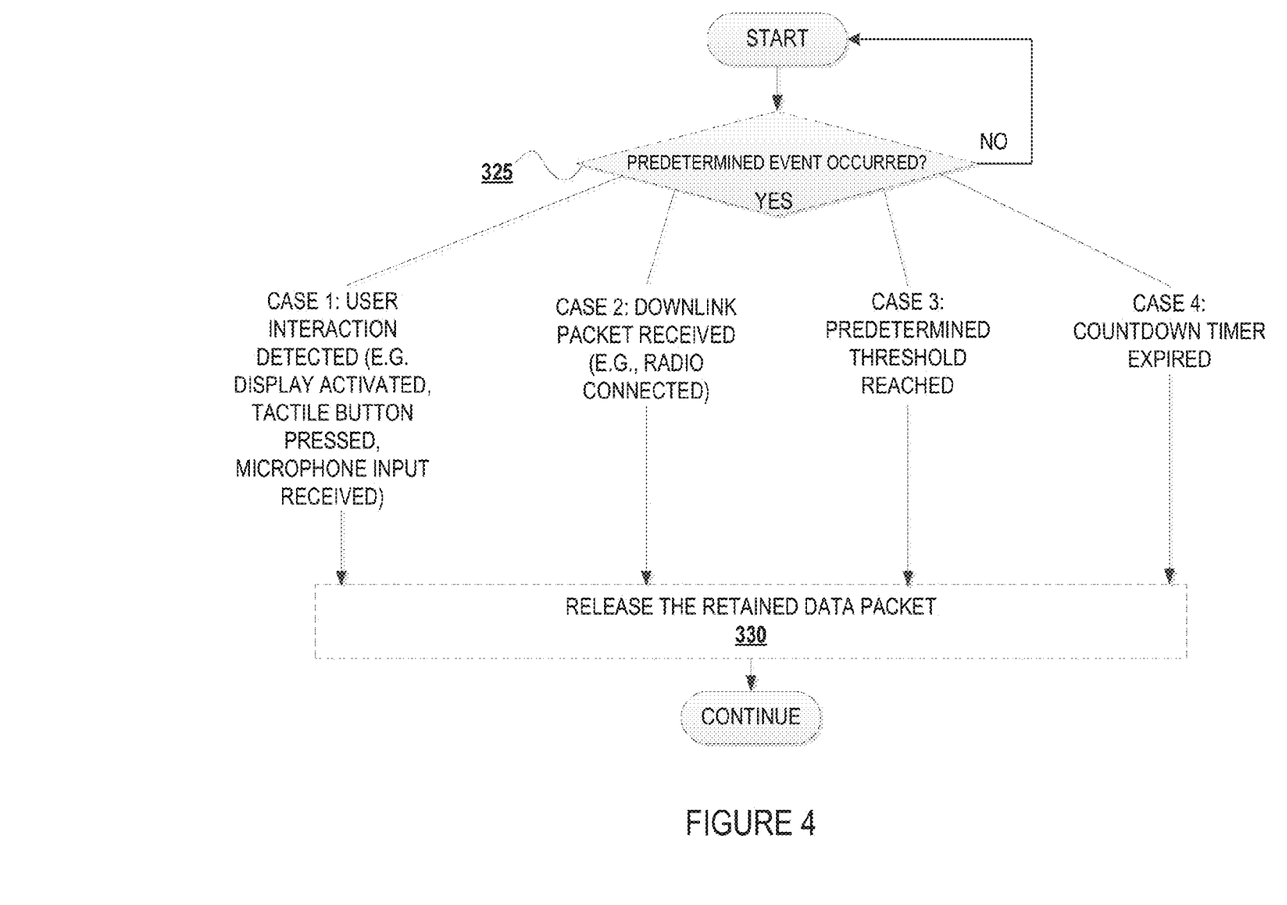
FIG. 4 is a flow diagram illustrating a plurality of predetermined events which may cause a plurality of retained data packets to be released, in accordance with various embodiments.

FIG. 4 illustrates a plurality of predetermined events which may cause a plurality of retained data packets to be released, in accordance with various embodiments. FIG. 4 shows a plurality of cases associated with decision block 325 of FIG. 3. Where decision block 325 indicates that the predetermined event has not occurred, the method 300 may iterate through the operations as described herein.

According to embodiments, the predetermined event of decision block 325 may be at least one of four cases. According to an embodiment, the predetermined event may be a user interaction. Therefore, the predetermined event may be determined to have occurred when the user interaction is detected. In various embodiments, the user interaction may be or may cause (such that user interaction may be inferred) the activation of a display. In another embodiment, the user interaction may be the depression of a tactile button, such as a tactile button on a housing of the device performing the method 300 (e.g., a keyboard button, a "home" button, a volume button, etc.). In a third embodiment, the user interaction may be the reception of microphone input. For example, a microphone of a device may detect audio signals corresponding to an action that the device is to perform, such as a voice command.

In accordance with embodiments, the predetermined event may be downlink packet transmission, and therefore the predetermined event may be determined to have occurred upon reception of a downlink packet. The reception of a downlink packet may cause a radio to transition out of an idle state (e.g., the radio may transition to a connected state to receive the downlink packet). Because the radio may no longer be in an idle state, a device may no longer be in a low-power state and power conserving techniques may be no longer preferable to uplink transmission of data packets.

In various embodiments, the predetermined event may be a predetermined threshold, such as a threshold amount of data packets or a threshold amount of buffer space. The predetermined event may be determined to have occurred when the predetermined threshold is reached or exceeded. For example, when a predetermined amount of data packets are retained or where a predetermined amount of buffer space is consumed by retained data packets, the predetermined threshold may be reached or exceeded.

In embodiments, the predetermined event may be a countdown timer. The expiration of the countdown timer may indicate that the predetermined event has occurred. This countdown timer may begin counting down where, for example, a data packet is retained or the device is determined to be in a low-power state so that data packets are to be retained. According to some embodiments, the duration of the countdown timer may be configurable, such as through user input or control information received from an access node.

The preceding four cases may indicate, for example, that the device performing the method 300 is no longer in a low-power state, that the device is no longer capable of retaining data packets, and/or that retained data packets are in danger of becoming stale. Therefore, an indication at decision block 325 of the occurrence of at least one of the preceding four cases may cause the method 300 to advance to operation 330. Accordingly, the one or more retained data packets may be released.

Figure 5:
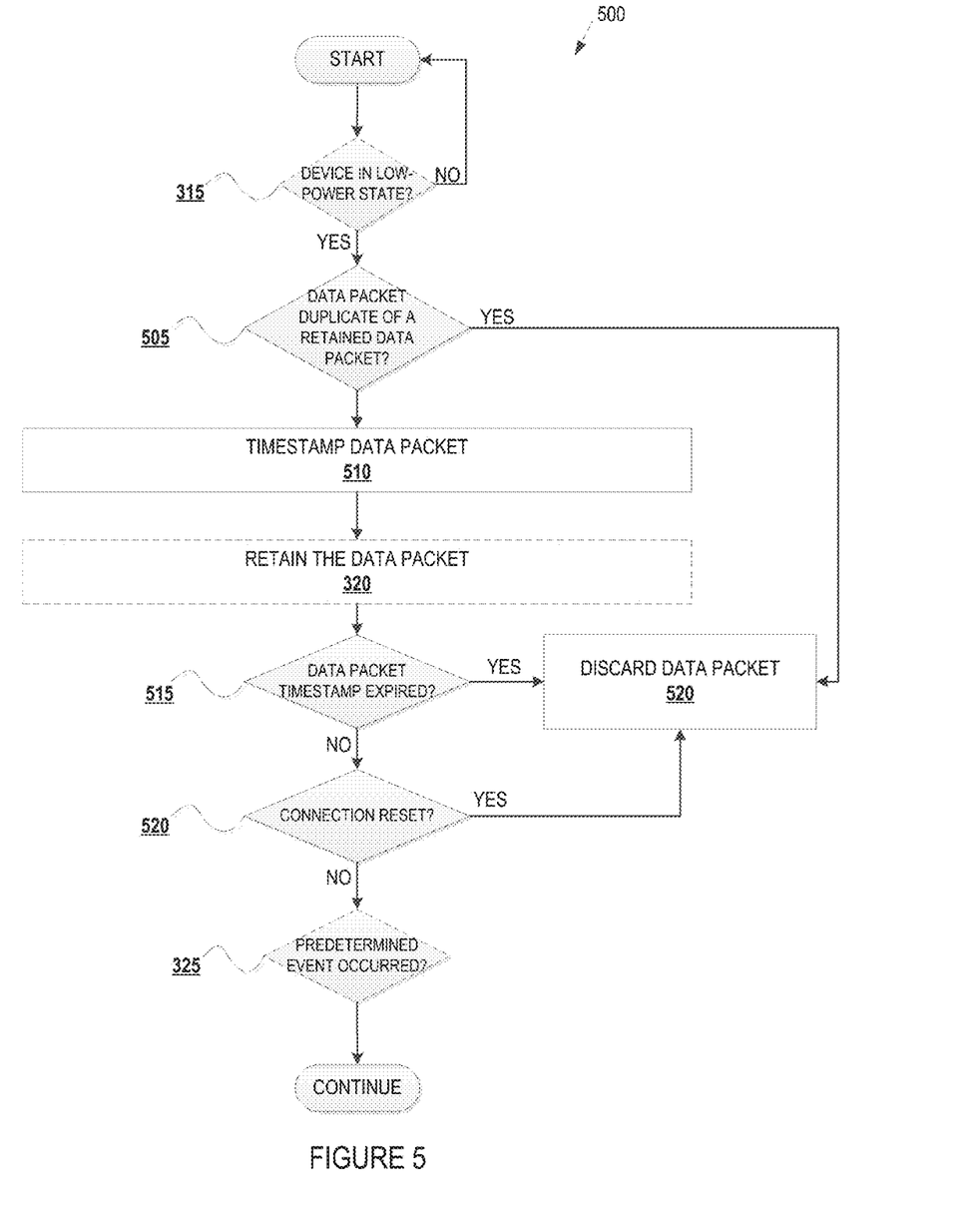
FIG. 5 is a flow diagram illustrating a method for avoiding unnecessary transmission of at least one data packet where a plurality of data packets is to be retained before transmission, in accordance with various embodiments.

With respect to FIG. 5, a flow diagram is shown illustrating a method 500 for avoiding unnecessary transmission of at least one data packet, in accordance with various embodiments. The method 500 may be performed by the device 100 illustrated in FIG. 1. As illustrated, the method 500 shows a plurality of operations that may be performed in the method 300 of FIG. 3. While FIG. 5 illustrates a plurality of sequential operations, one of ordinary skill would understand that one or more operations of the method 500 may be transposed and/or performed contemporaneously.

According to embodiments, the method 500 may begin at decision block 315. Where decision block 315 indicates that the device is not in a low-power state, the method 500 may return to the start, which may include the operations 305-310 of FIG. 3 as described herein. Based on an indication at decision block 315 that the device is in a low-power state, the method 500 may reach decision block 505.

Decision block 505 may include determining if a data packet is a duplicate of a retained data packet. In various embodiments, a first data packet (e.g., most recently generated data packet) may be compared to one or more retained data packets (e.g., a data packet buffered at operation 320 through a previous iteration of the method 300). If decision block 505 indicates that the first data packet is a duplicate of a currently retained data packet, the method 500 may reach operation 520. Operation 520 includes discarding a data packet. In one embodiment, the currently retained data packet (e.g., older data packet) is discarded so that the retention and transmission of stale data packets may be avoided. In another embodiment, the first data packet (e.g., most recently generated data packet) is discarded.

The method 500 may reach the following operation 510 differently according to embodiments. In one embodiment, the decision block 505 indicates that the data packet is not a duplicate, and the method 500 proceeds. In a second embodiment, the decision block 505 indicates that the data packet is a duplicate—however, the currently retained data packet (e.g., older data packet) is discarded at operation 520. In this second embodiment, the method 500 may still advance to operation 510 even though the data packet is a duplicate of a currently retained data packet.

Operation 510 includes adding a timestamp to the data packet. This timestamp may indicate, for example, a time at which the data packet was generated and/or retained. Subsequently, operation 320 includes retaining the time-stamped data packet (e.g., in a buffer). Thereafter, decision block 515 includes determining if the timestamp for the retained data packet is expired. This decision may be based on, for example, a predetermined duration for which a data packet is to be retained before that data packet is considered "stale." Where decision block 515 indicates that the timestamp for the data packet is expired, the data packet is discarded at operation 520.

The method 500 may reach decision block 520 for determining if a connection has been reset. In one embodiment, decision block 520 may base this determination on the reception of an indication (e.g., a message) signaling that a connection over which data packets are to be transmitted has been reset—e.g., a TCP/IP connection reset message. Where decision block 520 indicates that a connection has been reset, the method 500 may proceed to operation 520 for discarding a data packet. In embodiments, an indication at decision block 520 that the connection has been reset may cause all retained data packets to be discarded.

Where decision block 520 does not indicate that the connection has been reset, the method 500 may proceed to decision block 325. Decision block 325 is described with respect to FIG. 3, and the method 300 may proceed as described herein. The method 500 may prevent unnecessary and/or deleterious transmission of stale and/or duplicate data packets during performance of the method 300.

Figure 6:
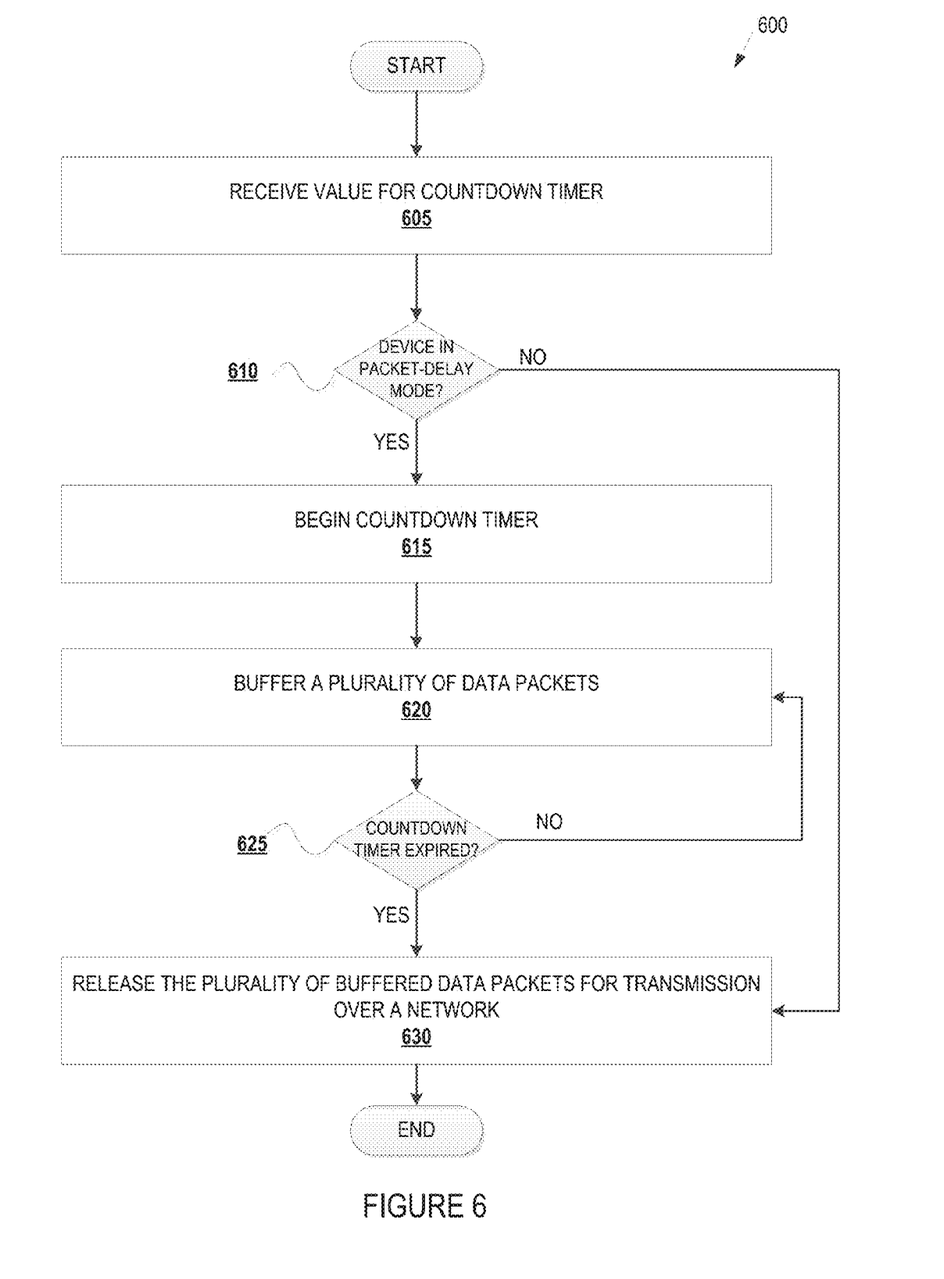
FIG. 6 is a flow diagram illustrating a method for buffering a plurality of data packets for at least a predetermined amount of time before transmission over a network, in accordance with various embodiments.

Turning to FIG. 6, a flow diagram is shown illustrating a method 600 for buffering a plurality of data packets for at least a predetermined amount of time before transmission over a network, in accordance with various embodiments. The method 600 may be performed by the device 100 illustrated in FIG. 1. While FIG. 6 illustrates a plurality of sequential operations, one of ordinary skill would understand that one or more operations of the method 600 may be transposed and/or performed contemporaneously.

Beginning at operation 605, the method 600 may include receiving a value for a countdown timer. The countdown timer value may be differently received, according to embodiments. In one embodiment, the countdown timer value may be received as input from a user. In another embodiment, the countdown timer value may be received from an access node, such as an eNB adapted to provide a wireless cell. The countdown timer may be set to this received value. Accordingly, the countdown timer may be configurable for varying situations, such as situations in which packets may become stale at various times.

Decision block 610 may include determining that the device is in a packet-delay mode. This determination may be based on a state of one or more components that may be included in a device performing the method 600. For example, where a display is deactivated and a radio is in an idle, then the device may be in packet-delay mode. In another embodiment, the device may be in a "sleep" mode or other low-power mode during which time it may be undesirable to transmit data packets. Where the device is not in a packet-delay mode, the method 600 may advance to operation 630 for releasing the buffered data packets for transmission over a network.

Based on an indication at decision block 610 that the device is in a packet-delay mode, the method 600 may reach operation 615. Operation 615 may include beginning the countdown timer so that the countdown timer runs for the configured duration. Because decision block 610 indicated that the device is in a packet-delay mode, operation 620 includes buffering a plurality of data packets. In various embodiments, the plurality of data packets may be generated by one or more applications and queued in one or more buffers to delay transmission of the plurality of data packets.

Subsequently, decision block 625 may include determining that the countdown timer has expired. Where decision block 625 indicates that the countdown timer has not expired, the method 600 may remain at operation 620 for buffering the plurality of data packets. However, where decision block 625 indicates that the countdown timer has expired, the method 600 may proceed to operation 630. Operation 630 may include releasing the plurality of buffered data packets for transmission over the network. In view of the foregoing operations, one or more data packets may be buffered while a device is in a packet-delay mode to converse power at the device, while contemporaneously reconciling that with the timely transmission of data packets.

Figure 7:
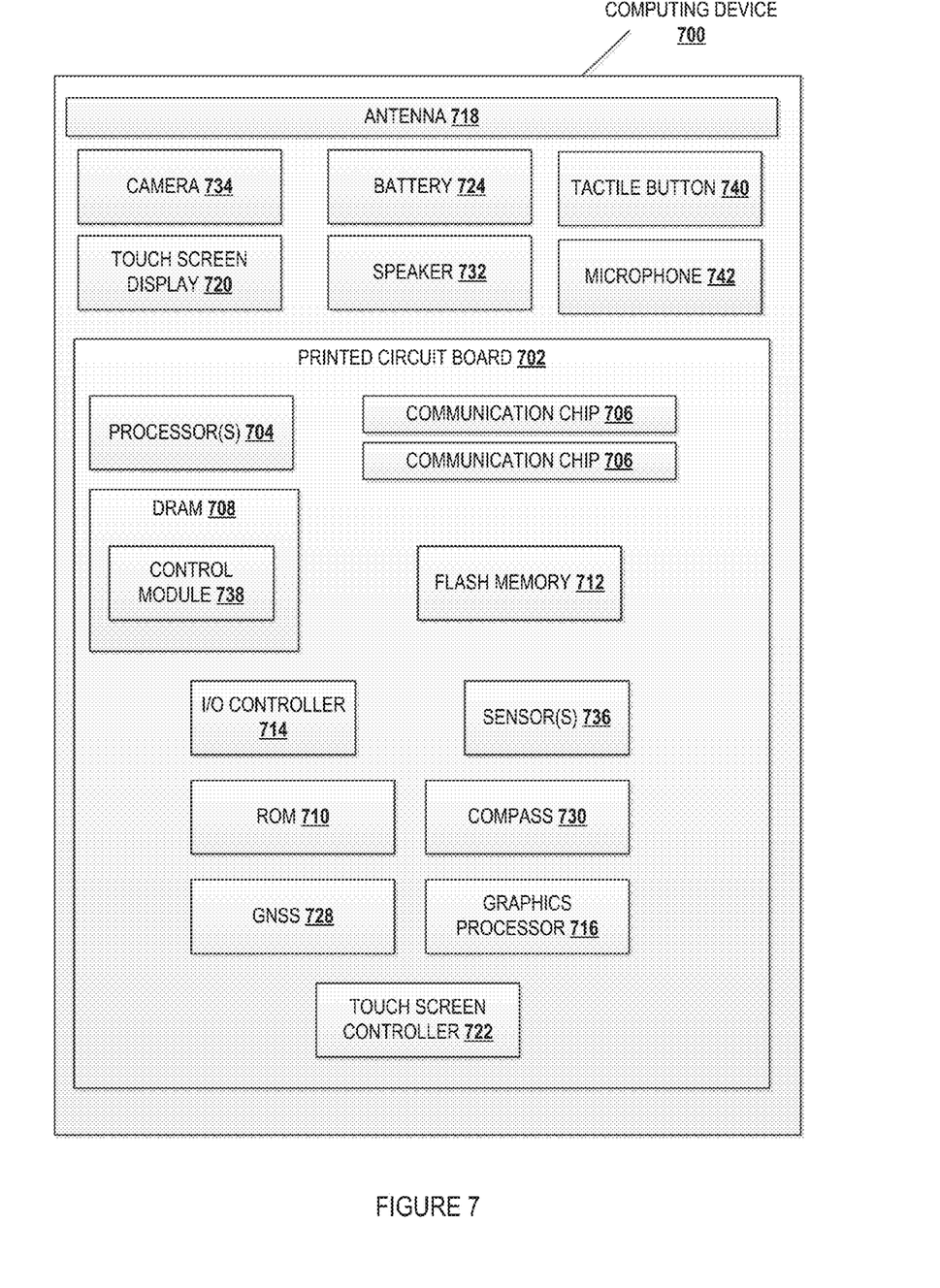
FIG. 7 is a block diagram of a computing device adapted to operate in a wireless communication network, in accordance with various embodiments.

Now with reference to FIG. 7, a block diagram illustrates an example computing device 700, in accordance with various embodiments. The device 100 of FIG. 1 and described herein may be implemented on a computing device such as computing device 700. Further, the computing device 700 may be adapted to perform one or more operations of the method 300 described with respect to FIG. 3, the method 500 described with respect to FIG. 5, and/or the method 600 described with respect to FIG. 6. The computing device 700 may include a number of components, one or more processor 704 and at least one communication chips 706. Depending upon the embodiment, one or more of the enumerated components may comprise "circuitry" of the computing device 700, such as processing circuitry, communication circuitry, and the like. In various embodiments, the one or more processor(s) 704 each may be a processor core. In various embodiments, the at least one communication chips 706 may be physically and electrically coupled with the one or more processor(s) 704. In further implementations, the communication chips 706 may be part of the one or more processor(s) 704. In various embodiments, the computing device 700 may include a printed circuit board ("PCB") 702. For these embodiments, the one or more processors 704 and communication chip 706 may be disposed thereon. In alternate embodiments, the various components may be coupled without the employment of the PCB 702.

Depending upon its applications, the computing device 700 may include other components that may or may not be physically and electrically coupled with the PCB 702. These other components include, but are not limited to, volatile memory (e.g., dynamic random access memory 708, also referred to as "DRAM"), non-volatile memory (e.g., read only memory 710, also referred to as "ROM"), flash memory 712, an input/output controller 714, a digital signal processor (not shown), a crypto processor (not shown), a graphics processor 716, one or more antenna(s) 718, a display (not shown), a touch screen display 720, a touch screen controller 722, a battery 724, an audio codec (not shown), a video code (not shown), a global navigation satellite system 728, a compass 730, an accelerometer (not shown), a gyroscope (not shown), a speaker 732, a camera 734, one or more sensors 736 (e.g., a barometer, Geiger counter, thermometer, viscometer, rheometer, altimeter, or other sensor that may be found in various manufacturing environments or used in other applications), a mass storage device (e.g., a hard disk drive, s solid state drive, compact disk and drive, digital versatile disk and drive, etc.) (not shown), and the like. In various embodiments, the one or more processor(s) 704 may be integrated on the same die with other components to form a system on a chip ("SOC").

In various embodiments, volatile memory (e.g., DRAM 708), non-volatile memory (e.g., ROM 710), flash memory 712, and the mass storage device (not shown) may include programming instructions configured to enable the computing device 700, in response to the execution by one or more processors 704, to practice all or selected aspects of the data exchanges and methods described herein, depending on the embodiment of the computing device 700 used to implement such data exchanges and methods. More specifically, one or more of the memory components (e.g., DRAM 708, ROM 710, flash memory 712, and the mass storage device) may include temporal and/or persistent copies of instructions that, when executed by one or more processors 704, enable the computing device 700 to operate one or more modules 738 configured to practice all or selected aspects of the data exchanges and method described herein, depending on the embodiment of the computing device 700 used to implement such data exchanges and methods.

The communication chips 706 may enable wired and/or wireless communication for the transfer of data to and from the computing device 700. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 706 may implement any of a number of wireless standards or protocols, including but not limited to Long Term Evolution ("LTE"), LTE Advanced ("LTE-A"), Institute of Electrical and Electronics Engineers ("IEEE") 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data Rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as other wireless protocols that are designated as 3G, 4G, 5G, and beyond. The computing device 700 may include a plurality of communication chips 706 adapted to perform different communication functions. For example, a first communication chip 706 may be dedicated to shorter range wireless communications, such as Wi-Fi and Bluetooth, whereas a second communication chip 706 may be dedicated to longer range wireless communications, such as GPS, EDGE, GPRS, CDMA, WiMAX, LTE, LTE-A, Ev-DO, and the like.

In various embodiments, the computing device 700 may include a crystal oscillator 740. The crystal oscillator 740 may be communicatively coupled with the communication chip(s) 706 and/or other communication circuitry. The crystal oscillator may use mechanical resonance of vibrating crystal (e.g., of piezoelectric material) to create an electrical signal with a very precise frequency. Thus, the crystal oscillator 740 may be used to generate signals that are transmitted by a UE.

In various implementations, the computing device 700 may be a laptop, netbook, a notebook computer, an ultrabook computer, a smart phone, a computing tablet, a personal digital assistant ("PDA"), an ultra mobile personal computer, a mobile phone, a desktop computer, a server, a printer, a scanner, a monitor, a set-top box, an entertainment control unit (e.g., a gaming console), a digital camera, a portable digital media player, a digital video recorder, and the like. In further embodiments, the computing device 700 may be another other electronic device that processes data.

Figure 8:
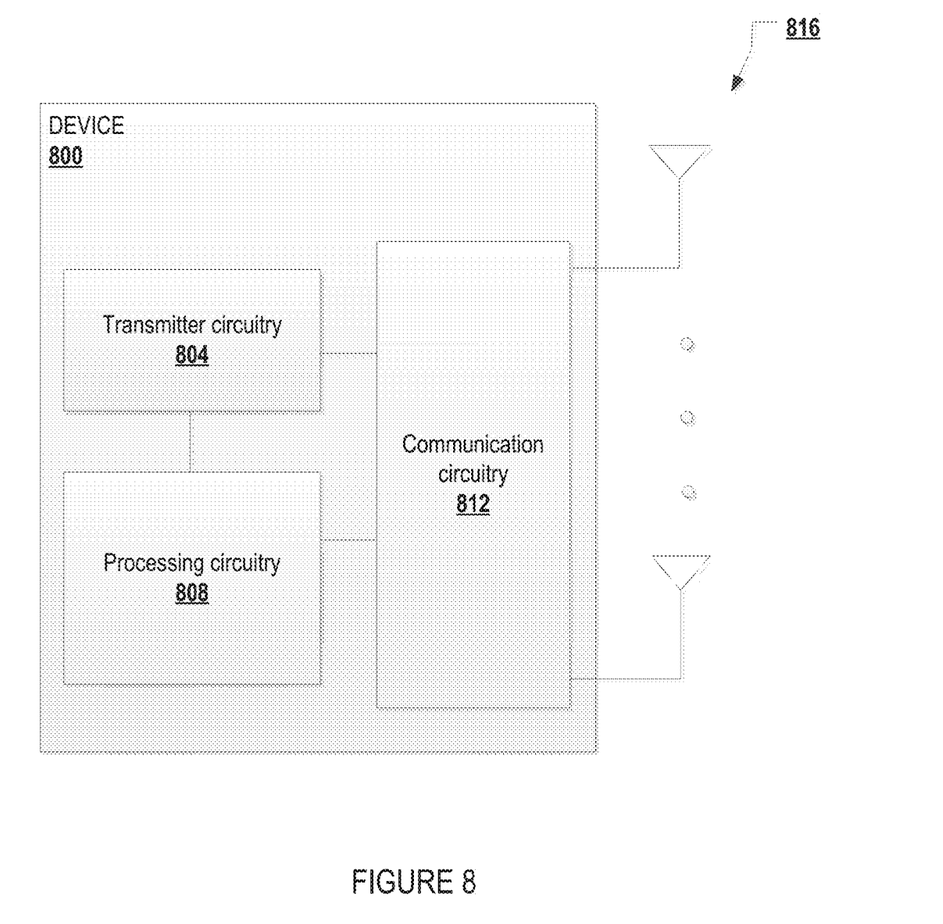
FIG. 8 is a block diagram of a transmitting device, in accordance with various embodiments.

FIG. 8 illustrates a device 800 in accordance with some embodiments. The device 800 may be similar to, and substantially interchangeable with, the device 100 of FIG. 1. The device 800 may include transmitter circuitry 804, processing circuitry 808, communication circuitry 812, and one or more antennas 816 coupled with each other at least as shown.

Briefly, the communication circuitry 812 may be coupled with the antennas to facilitate over-the-air communication of signals to/from the device 800. Operations of the communication circuitry 812 may include, but is not limited to, filtering, amplifying, storing, modulating, demodulating, transforming, etc.

The transmitter circuitry 804 may be coupled with the communication circuitry 812 and may be configured to provide signals to the communication circuitry 812 for transmission by the antennas 816. In various embodiments, the transmitter circuitry 804 may be configured to provide various signal processing operations on the signal to provide the signal to the communication circuitry with appropriate characteristics.

The processing circuitry 808 may be coupled with the communication circuitry 812 and may be configured to receive signals from the communication circuitry 812 for transmission by the communication circuitry 812. In some embodiments, the processing circuitry 808 may be adapted to generate signals. Further, the processing circuitry 808 may be adapted to scramble, multiplex, and/or modulate various signals prior to transmission by the communication circuitry 812.

Some or all of the communication circuitry 812, transmitter circuitry 804, and/or the processing circuitry 808 may be included in, for example, a communication chip and/or communicatively coupled with a printed circuit board as described with respect to FIG. 7.

In various embodiments, example 1 may be an apparatus to be included in a UE, the apparatus comprising: processing circuitry to: determine that a display of the UE is in a deactivated state; determine that the UE is in a low-power state based on the determination that the display is in the deactivated state; retain a plurality of data packets for upload transmission over a network based on the determination that the UE is in the low-power state; detect an occurrence of a predetermined event; and release the plurality of data packets based on the detected occurrence of the predetermined event; and radio circuitry, communicatively coupled with the processing circuitry, to transmit the released plurality of data packets over the network. Example 2 may include the apparatus of example 1, wherein the processing circuitry is to: determine that the radio circuitry of the UE is in an idle state; and determine that the UE is in the low-power state based on the determination that the radio circuitry is in the idle state. Example 3 may include the apparatus of example 1, wherein the processing circuitry is to generate the plurality of data packets based on at least one request from an application associated with the UE. Example 4 may include the apparatus of example 1, wherein the processing circuitry is to retain the plurality of data packets as a queue in a buffer. Example 5 may include the apparatus of any of examples 1-4, wherein the predetermined event is an activation of a display of the UE, reception of a downlink data packet by the UE, expiration of a timer associated with the retention of the plurality of data packets, or exceedance of a predetermined threshold associated with a buffer for storage of the plurality of data packets. Example 6 may include the apparatus of any of examples 1-4, further comprising: a timer associated with the retention of the plurality of data packets, the timer to be set with a value that is provided as input to the UE, wherein the predetermined event is an expiration of the timer. Example 7 may include the apparatus of any of examples 1-4, wherein the processing circuitry is further to: apply a timestamp to each data packet of the plurality of data packets; compare a respective timestamp of a respective data packet to a predetermined time value; and discard the respective data packet based on the comparison of the respective timestamp to the predetermined time value. Example 8 may include the apparatus of any of examples 1-4, wherein the processing circuitry is further to: compare a first data packet of the plurality of data packets to a second data packet for detection of duplicate data packets; and discard the second data packet based on the comparison of the first data packet and the second data packet. Example 9 may include the apparatus of any of examples 1-4, wherein the processing circuitry is further to detect a reset of a connection associated with the UE, and to discard the plurality of data packets in response to the detection of the reset of the connection.

In various embodiments, example 10 may be an apparatus to be included in a user equipment ("UE"), the apparatus comprising: a traffic shaping module, including shaping logic to: determine that radio circuitry of the UE is in an idle state; queue a plurality of data packets for transmission over a network based on the determination that the radio circuitry is in the idle state; release the plurality of data packets based on a predetermined event associated with the UE; and a buffer, communicatively coupled with the traffic shaping module, to queue the plurality of data packets. Example 11 may include the apparatus of example 10, wherein the traffic shaping module logic is to release the plurality of data packets from the buffer. Example 12 may include apparatus of example 10, wherein the traffic shaping module logic is further to detect an absence of interaction with the UE, and to queue the plurality of data packets further based on the detection of the absence of interaction with the UE. Example 13 may include the apparatus of example 12, wherein the traffic shaping module logic is to detect the absence of the interaction with the UE based on an off state of a display of the device, an absence of input at a microphone associated with the UE, an absence of tactile input received by the UE, or an absence of output by a speaker associated with the UE. Example 14 may include the apparatus of any of examples 10-12, wherein, before the traffic shaping module logic is to queue the plurality of data packets, the plurality of data packets are generated at a transmission control protocol of the internet protocol ("TCP/IP") stack of the UE based on one or more requests from an application layer of the UE. Example 15 may include the apparatus of any of examples 10-12, wherein the predetermined event is based on a state of a display of the UE, a state of the radio of the UE, a timer of the UE associated with the queue, and a threshold associated with a buffer for storage of the plurality of data packets. Example 16 may include the apparatus of example 15, wherein a duration of the timer associated with the queue of is configurable. Example 17 may include the apparatus of any of examples 10-12, wherein the traffic shaping module logic is further to associate a timestamp with a first data packet of the plurality of data packets, and to discard the first data packet based on the timestamp associated with the first data packet. Example 18 may include the apparatus of any of examples 10-12, wherein the traffic shaping module logic is further to discard a first data packet that duplicates an existing data packet in the plurality of data packets so that duplicate data is not transmitted by the communications circuitry. Example 19 may include the apparatus of any of examples 10-12, wherein the traffic shaping module logic is further to detect a change to a connection for the transmission of the data packets, and to discard the plurality of data packets in response to the detection of the change to the connection.

In various embodiments, example 20 may be a method to be performed in a user equipment ("UE"), the method comprising: determining that the UE is in a packet-delay mode; buffering, for at least a predetermined period of time, a plurality of data packets intended for transmission over a network based on the determining that the UE is in the packet-delay mode; and releasing the plurality of buffered data packets for transmission over the network based on an expiration of the predetermined period of time. Example 21 may include the method of example 20, further comprising: packetizing data into the plurality of data packets for transmission over the network. Example 22 may include the method of example 20, wherein the determining that the UE is in the packet-delay mode comprises: determining that a display of the UE is off; and determining that a radio of the UE is in an idle state. Example 23 may include the method of any of examples 20-22, further comprising: receiving a value for the predetermined period of time; and setting a countdown timer to the received value, wherein expiration of the countdown timer indicates the expiration of the predetermined period of time. Example 24 may include the method of any of examples 20-22, further comprising: detecting a change to a connection for the transmission of the data packets, and discarding the plurality of data packets in response to the detection of the change to the connection. Example 25 may include the method of any of examples 20-22, further comprising: associating a timestamp with a first data packet of the plurality of data packets; discarding the first data packet where the timestamp associated with the first data packet exceeds a predetermined time threshold.

In various embodiments, example 26 may be a non-transitory computing device-readable medium comprising computing device-executable instructions, wherein the instructions, in response to execution by a computing device, cause the computing device to: determine that a display of the UE is in a deactivated state; determine that the UE is in a low-power state based on the determination that the display is in the deactivated state; retain a plurality of data packets for upload transmission over a network based on the determination that the UE is in the low-power state; detect an occurrence of a predetermined event; release the plurality of data packets based on the detected occurrence of the predetermined event; and transmit the released plurality of data packets over the network. Example 27 may include the non-transitory computing device-readable medium of example 26, wherein the instructions are further to cause the computing device to: determine that the radio circuitry of the UE is in an idle state; and determine that the UE is in the low-power state based on the determination that the radio circuitry is in the idle state. Example 28 may include the non-transitory computing device-readable medium of example 26, wherein the instructions are further to cause the computing device to: generate the plurality of data packets based on at least one request from an application associated with the UE. Example 29 may include the non-transitory computing device-readable medium of example 26, wherein the plurality of data packets are to be retained as a queue in a buffer. Example 30 may include the non-transitory computing device-readable medium of example 26, wherein the predetermined event is an activation of a display of the UE, reception of a downlink data packet by the UE, expiration of a timer associated with the retention of the plurality of data packets, or exceedance of a predetermined threshold associated with a buffer for storage of the plurality of data packets. Example 31 may include the non-transitory computing device-readable medium of example 30, wherein the instructions are further to cause the computing device to: begin countdown of the timer associated with the retention of the plurality of data packets, the timer to be set with a value that is provided as input to the UE. Example 32 may include the non-transitory computing device-readable medium of any of examples 26-30, wherein the instructions are further to cause the computing device to: apply a timestamp to each data packet of the plurality of data packets; compare a respective timestamp of a respective data packet to a predetermined time value; and discard the respective data packet based on the comparison of the respective timestamp to the predetermined time value. Example 33 may include the non-transitory computing device-readable medium of any of examples 26-30, wherein the instructions are further to cause the computing device to: compare a first data packet of the plurality of data packets to a second data packet for detection of duplicate data packets; and discard the second data packet based on the comparison of the first data packet and the second data packet. Example 34 may include the non-transitory computing device-readable medium of any of examples 26-30, wherein the instructions are further to cause the computing device to: detect a reset of a connection associated with the UE; and discard the plurality of data packets in response to the detection of the reset of the connection.

In various embodiments, example 35 may include an apparatus to be included in a user equipment ("UE"), the apparatus comprising: means for determining that radio circuitry of the UE is in an idle state; means for queuing a plurality of data packets for transmission over a network based on the determination that the radio circuitry is in the idle state; and means for releasing the plurality of data packets based on a predetermined event associated with the UE. Example 36 may include the apparatus of example 35, wherein the queuing means is further to detect an absence of interaction with the UE, and to queue the plurality of data packets further based on the detection of the absence of interaction with the UE. Example 37 may include the apparatus of example 36, wherein the queuing means is to detect the absence of the interaction with the UE based on an off state of a display of the device, an absence of input at a microphone associated with the UE, an absence of tactile input received by the UE, or an absence of output by a speaker associated with the UE. Example 38 may include the apparatus of any of examples 35-36, further comprising: means for generating the plurality of data packets are generated at a TCP/IP stack of the UE based on one or more requests from an application layer of the UE, before the queuing means is to queue the plurality of data packets. Example 39 may include the apparatus of any of examples 35-36, wherein the predetermined event is based on a state of a display of the UE, a state of the radio of the UE, a timer of the UE associated with the queue, and a threshold associated with a buffer for storage of the plurality of data packets. Example 40 may include the apparatus of example 39, wherein a duration of the timer associated with the queue of is configurable.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An apparatus to be included in a user equipment ("UE"), the apparatus comprising:
    processing circuitry to:
        determine that a display of the UE is in a deactivated state;
        determine that radio circuitry, communicatively coupled with the processing circuitry, is in an idle state;
        retain a plurality of data packets for upload transmission over a network based on the determination that the display of the UE is in the deactivated state and the determination that the radio circuitry is in the idle state;
        detect an occurrence of a predetermined event, wherein the predetermined event is an activation of the display of the UE, a reception of a downlink data packet by the UE, a retention of a predetermined threshold amount of data packets associated with a buffer for storage of the plurality of data packets, or an expiration of a timer associated with the retention of the plurality of data packets; and
        release the plurality of data packets for transmission based on the detected occurrence of the predetermined event; and
    the radio circuitry to transmit the released plurality of data packets over the network.

2. The apparatus of claim 1, wherein the processing circuitry is to generate the plurality of data packets based on at least one request from an application associated with the UE.

3. The apparatus of claim 1, wherein the processing circuitry is to retain the plurality of data packets as a queue in a buffer.

4. The apparatus of claim 1, wherein the predetermined event is the activation of a display of the UE, the reception of a downlink data packet by the UE, or the retention of the predetermined threshold amount of data packets associated with a buffer for storage of the plurality of data packets.

5. The apparatus of claim 1, further comprising:
    the timer, wherein the timer is associated with the retention of the plurality of data packets, the timer to be set with a value that is provided as input to the UE,
    wherein the predetermined event is the expiration of the timer.

6. The apparatus of claim 1, further comprising the timer associated with the retention of the plurality of data packets to initiate a count in response to initiation of the retention of the plurality of data packets.

7. The apparatus of claim 1, wherein the processing circuitry is further to:
    intercept the plurality of data packets transmitted from a transmission control protocol of the internet protocol ("TCP/IP") stack of the UE toward the radio circuitry in response to determination that the display of the UE is in the deactivated state and the determination that the radio circuitry is in the idle state, wherein to release the plurality of data packets includes to transmit the plurality of data packets intercepted to the radio circuitry for transmission.

8. An apparatus to be included in a user equipment ("UE"), the apparatus comprising:
    traffic shaping logic to:
        determine that a display of the UE is in an off state;
        determine that radio circuitry of the UE is in an idle state;
        queue a plurality of data packets for transmission over a network in response to the determination that the radio circuitry is in the idle state and the determination that the display of the UE is in the off state;
        release the plurality of data packets in response to a predetermined event associated with the UE; and
    a buffer, communicatively coupled with the traffic shaping logic, to queue the plurality of data packets.

9. The apparatus of claim 8, wherein the traffic shaping logic is to release the plurality of data packets from the buffer.

10. The apparatus of claim 8, wherein the traffic shaping logic is further to detect an absence of interaction with the UE, and to queue the plurality of data packets further based on the detection of the absence of interaction with the UE.

11. The apparatus of claim 10, wherein the traffic shaping logic is to detect the absence of the interaction with the UE based on an absence of input at a microphone associated with the UE, an absence of tactile input received by the UE, or an absence of output by a speaker associated with the UE.

12. The apparatus of claim 8, wherein, before the traffic shaping logic is to queue the plurality of data packets, the plurality of data packets are generated at a transmission control protocol of the internet protocol ("TCP/IP") stack of the UE based on one or more requests from an application layer of the UE.

13. The apparatus of claim 8, wherein the predetermined event is based on a state of a display of the UE, a state of the radio of the UE, a timer of the UE associated with the queue, and a threshold associated with a buffer for storage of the plurality of data packets.

14. The apparatus of claim 13, wherein a duration of the timer associated with the queue is configurable.

15. The apparatus of claim 8, wherein the traffic shaping logic is further to:
determine that the display of the UE transitions to an on state, wherein the predetermined event includes the transition of UE to the on state.

16. The apparatus of claim 8, wherein the traffic shaping logic is further to:
identify an expiration of a timer that initiates a count in response to the queue of the plurality of data packets, wherein the predetermined event includes the expiration of the timer.

17. The apparatus of claim 8, wherein the traffic shaping logic is further to:
intercept the plurality of data packets transmitted from a TCP/IP stack of the UE toward the radio circuitry, wherein the release of the plurality of data packets includes transmission of the plurality of data packets intercepted from the buffer to the radio circuitry.

18. A method to be performed in a user equipment ("UE"), the method comprising:
determining that a display of the UE is in a deactivated state;
determining that radio circuitry of the UE is in an idle state;
buffering a plurality of data packets scheduled for transmission over a network in response to the determination that the display of the UE is in the deactivated state and the determination that the radio circuitry of the UE is in the idle state; and
releasing the plurality of buffered data packets for transmission over the network in response to a predetermined event.

19. The method of claim 18 wherein the method further comprises:
determining that the display of the UE transitioned into an activated state, wherein the predetermined event is the transition of the display of the UE into the activated state.

20. The method of claim 18, wherein the method further comprises:
detecting that an interaction with the UE, wherein the predetermined event is the interaction with the UE.

21. The method of claim 18, wherein the method further comprises:
detecting an expiration of a timer that initiated counting in response to the buffering of the plurality of data packets, wherein the predetermined event is the detected expiration of the timer.

22. The apparatus of claim 8, wherein the predetermined event is based on a state of a display of the UE, a state of the radio circuitry of the UE and a threshold amount associated with a buffer for storage of the plurality of data packets.

* * * * *